United States Patent
Kim et al.

(10) Patent No.: US 10,276,311 B2
(45) Date of Patent: Apr. 30, 2019

(54) APPARATUS AND METHOD FOR MANUFACTURING ELECTRODES

(71) Applicant: Electronics and Telecommunications Research Institute, Daejeon (KR)

(72) Inventors: In Gyoo Kim, Daejeon (KR); In-Kyu You, Gongju-si (KR); Bit Na Kim, Daejeon (KR); Ji Hwan Sul, Daejeon (KR); Yong Suk Yang, Daejeon (KR); Seok Hun Kang, Daejeon (KR); sunghoon Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/633,071

(22) Filed: Jun. 26, 2017

(65) Prior Publication Data

US 2018/0053604 A1    Feb. 22, 2018

(30) Foreign Application Priority Data

Aug. 16, 2016  (KR) .................. 10-2016-0103831
Dec. 8, 2016   (KR) .................. 10-2016-0167044

(51) Int. Cl.
*H01G 11/30* (2013.01)
*H01G 11/86* (2013.01)
(Continued)

(52) U.S. Cl.
CPC ........... *H01G 11/30* (2013.01); *C01B 32/198* (2017.08); *C02F 1/46109* (2013.01);
(Continued)

(58) Field of Classification Search
None
See application file for complete search history.

(56) References Cited

U.S. PATENT DOCUMENTS 5,194,396 A   3/1993  Kim et al.
5,733,793 A   3/1998  Song et al.
(Continued)

FOREIGN PATENT DOCUMENTS

KR   10-1062128 B1   9/2011

OTHER PUBLICATIONS

Simone Bertolazzi et al., "Nonvolatile Memory Cells Based on MoS2/Graphene Heterostructures", *ACS Nano* vol. 7 No. 4 (Mar. 19, 2013), p. 3246-3252.
(Continued)

*Primary Examiner* — Ali Naraghi
(74) *Attorney, Agent, or Firm* — Rabin & Berdo, P.C.

(57) ABSTRACT

Disclosed are an apparatus for manufacturing electrodes and a method of manufacturing electrodes. The method of manufacturing electrodes includes providing a metal substrate having first and second surfaces opposite to each other, performing a patterning process on the first surface of the metal substrate, coating an electrode material on the first surface of the metal substrate, after the patterning process, and irradiating the electrode material, which is coated on the metal substrate, with light. The patterning process includes forming a plurality of holes to penetrate the metal substrate or forming a plurality of grooves to have a shape recessed from the first surface toward the second surface.

8 Claims, 13 Drawing Sheets

(51) Int. Cl.
  *C02F 1/461* (2006.01)
  *C25B 11/04* (2006.01)
  *C01B 32/198* (2017.01)
  *H01B 1/04* (2006.01)
  *H01B 1/22* (2006.01)
  *H01G 11/28* (2013.01)
(52) U.S. Cl.
  CPC ............ *C25B 11/0478* (2013.01); *H01B 1/04* (2013.01); *H01B 1/22* (2013.01); *H01G 11/28* (2013.01); *H01G 11/86* (2013.01); *C02F 2001/46128* (2013.01); *C02F 2001/46138* (2013.01)

(56) References Cited

U.S. PATENT DOCUMENTS 8,120,892 B2  2/2012  Kim et al.
2013/0164612 A1*  6/2013  Tanemura ............... H01M 4/70
                                                    429/211
2015/0332870 A1  11/2015  Wood et al.
2017/0047588 A1*  2/2017  Mukherjee ............ H01M 4/587

OTHER PUBLICATIONS

Eiichiro Watanabe et al., "Low contact resistance metals for graphene based devices", *Diamond & Related Materials* 24 (Jan. 16, 2012), p. 171-174.

K. Nagashio et al., "Contact resistivity and current flow path at metal/graphene contact", *Applied Physics Letters* 97, 143514 (Oct. 8, 2010).

Yudi Tu, et al., "Vacuum—ultraviolet photoreduction of graphene oxide: Electrical conductivity of entirely reduced single sheets and reduced micro line patterns", *Applied Physics Letters* 106, 133105 (Apr. 1, 2015).

* cited by examiner

FIG. 2A
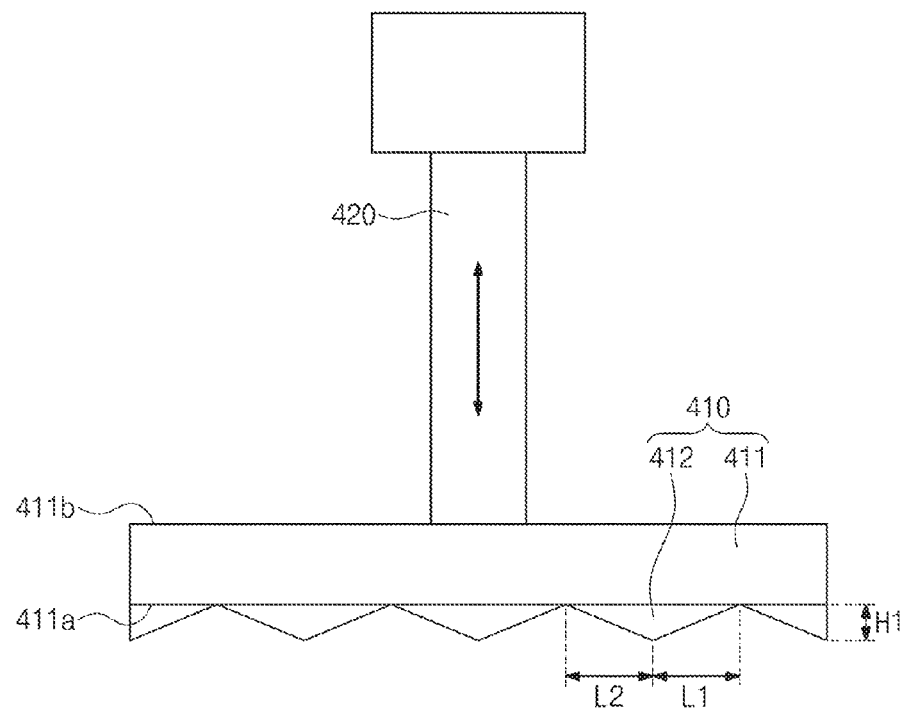
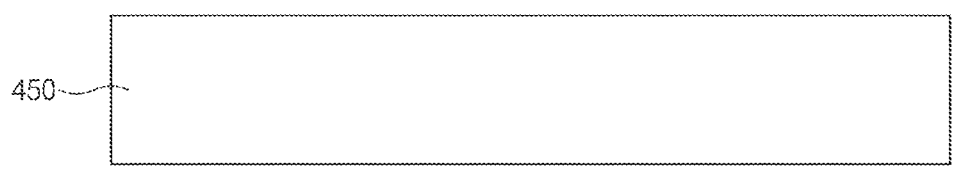
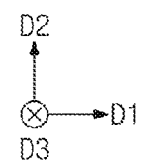

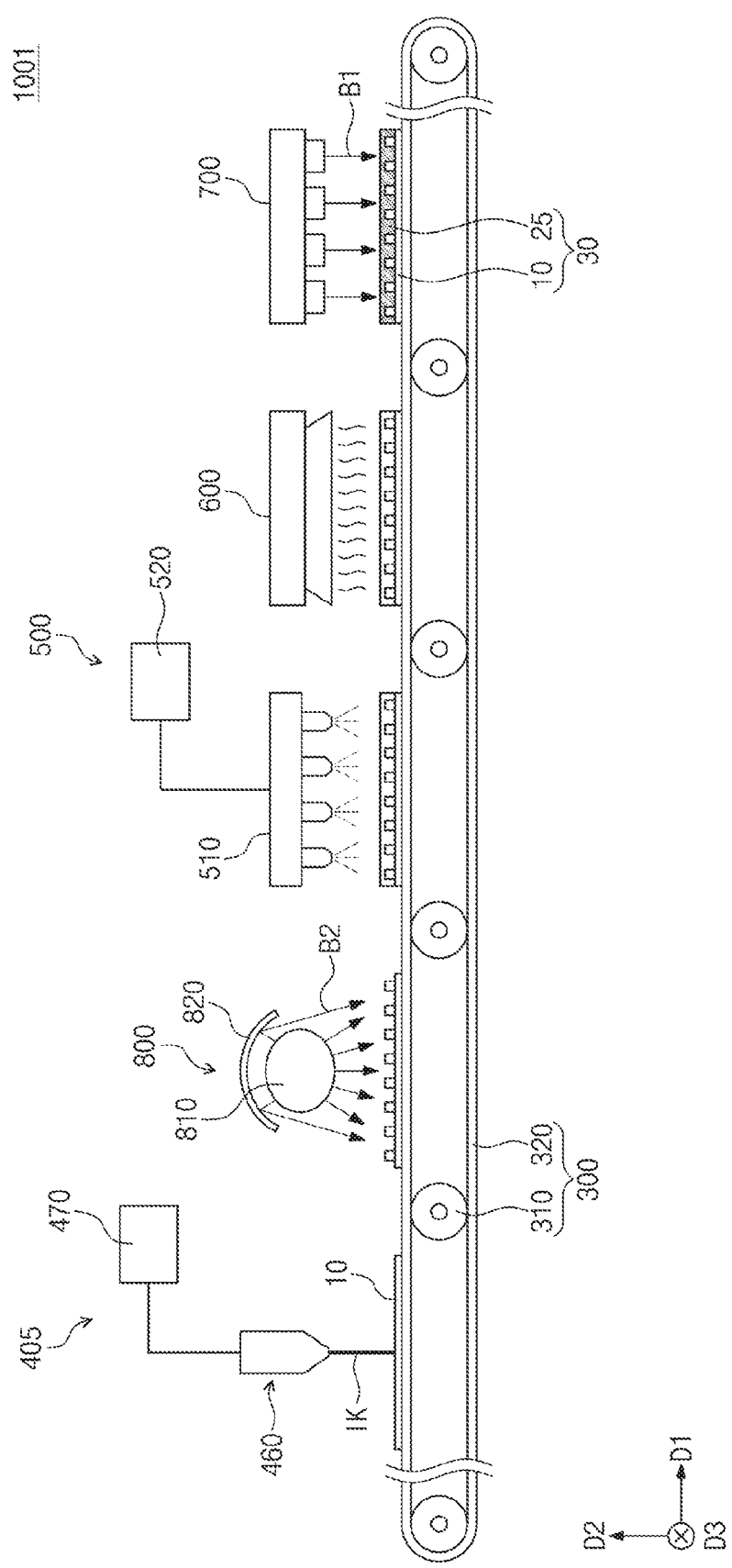

APPARATUS AND METHOD FOR MANUFACTURING ELECTRODES

CROSS-REFERENCE TO RELATED APPLICATIONS

This U.S. non-provisional patent application claims priority under 35 U.S.C. § 119 to Korean Patent Application No. 10-2016-0103831, filed on Aug. 16, 2016, in the Korean Intellectual Property Office, the entire contents of which are hereby incorporated by reference.

BACKGROUND OF THE INVENTION

Embodiments of the inventive concept relate to an apparatus and a method for manufacturing electrodes.

A supercapacitor is a capacitor having high capacitance and is also referred to as an "ultra-capacitor" or an "ultra-high capacitance capacitor". The supercapacitor uses a charging phenomenon by simple movement of ions to the interface of an electrode and an electrolyte or surface chemical reaction, unlike the battery using chemical reaction. Thus, it is possible to increase speed and efficiency in charging/discharging characteristics of the supercapacitor, and thus, the supercapacitor may be used as an auxiliary battery or an alternative to the conventional battery. Recently, various electrode structures for the supercapacitor are being studied.

SUMMARY

Some embodiments of the inventive concept may provide an apparatus for manufacturing an electrode substrate with increased contact area between a metal substrate and an electrode layer including an electrode material.

Some embodiments of the inventive concept may provide a method for rapidly manufacturing an electrode substrate.

According to some embodiments of the inventive concept, a method of manufacturing electrodes may include providing a metal substrate having first and second surfaces opposite to each other, performing a patterning process on the first surface of the metal substrate, coating an electrode material on the first surface of the metal substrate, after the patterning process, and irradiating the electrode material, which is coated on the metal substrate, with light. The patterning process includes providing a plurality of holes to penetrate the metal substrate or forming a plurality of grooves to have a shape recessed from the first surface toward the second surface.

In some embodiments, each of the grooves may include a first inclined surface extending downwardly from the first surface to the second surface and a second inclined surface extending upwardly from the second surface to the first surface.

In some embodiments, each of the grooves may include a bottom surface disposed between the first and second surfaces and a side surface connecting the bottom surface with the first surface.

In some embodiments, each of the holes may have a diameter less than a height between the first and the second surfaces.

In some embodiments, the diameter of the holes may be about 0.5 times the height between the first and second surfaces.

In some embodiments, the electrode material may include graphene oxide.

In some embodiments, the method may further include drying the electrode material coated on the metal substrate before the irradiating of the electrode material with light.

According to some embodiments of the inventive concept, a method of manufacturing electrodes may include performing a patterning process on a first surface of a metal substrate, the patterning process being performed using a metallic ink, coating an electrode material on the patterned first surface of the metal substrate, and irradiating the electrode material coated on the metal substrate with light. The pattering process may include forming a plurality of metal protrusions on the first surface of the metal substrate.

In some embodiments, each of the metal protrusions may be provided as a regular hexahedron shape having through-holes penetrating outside surfaces thereof.

In some embodiments, the method may further include irradiating the metal protrusions provided on the first surface with light before the coating of the electrode material on the first surface.

In some embodiments, the electrode material may include graphene oxide.

In some embodiments, the method may further include drying the electrode material coated on the metal substrate before the irradiating of the electrode material coated on the metal substrate with light.

According to some embodiments of the inventive concept, an electrode-manufacturing apparatus may include a transferring unit configured to transfer a metal substrate in a first direction; a patterning unit configured to pattern the metal substrate, the patterning unit provided on a path on which the metal substrate is transferred; an electrode coating unit configured to coat an electrode material on the metal substrate, the electrode coating unit spaced apart from the patterning unit in the first direction; and a first light irradiation unit configured to irradiate light, the first light irradiation unit spaced apart from the electrode coating unit in the first direction.

In some embodiments, the patterning unit may include a molding member including a base plate having a plurality of patterned protrusions protruded from a first surface thereof and a mold driving member configured to transfer the molding member to the metal substrate.

In some embodiments, each of the plurality of patterned protrusions may include a first mold surface obliquely extending from the first surface and a second mold surface obliquely extending from the first surface toward the first mold surface.

In some embodiments, each of the plurality of patterned protrusions may have a cylindrical shape.

In some embodiments, the patterning unit may include an ink spray nozzle configured to spray a metallic ink toward the metal substrate and a nozzle driving member configured to transfer the ink spray nozzle.

In some embodiments, the apparatus may further include a second light irradiation unit configured to irradiate light toward the metallic ink. The second light irradiation unit may be disposed between the patterning unit and the electrode coating unit.

In some embodiments, the apparatus may further include a drying unit configured to spray air toward the metal substrate, the drying unit disposed between the first light irradiation unit and the electrode coating unit.

In some embodiments, the metal material may include graphene oxide.

Details of other exemplary embodiments are included in the description and drawings.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

FIG. 2A is a schematic diagram illustrating a press unit shown in FIG. 1.

FIG. 4 is a schematic view illustrating an electrode-manufacturing apparatus according to example embodiments of the inventive concept.

Figure 1:
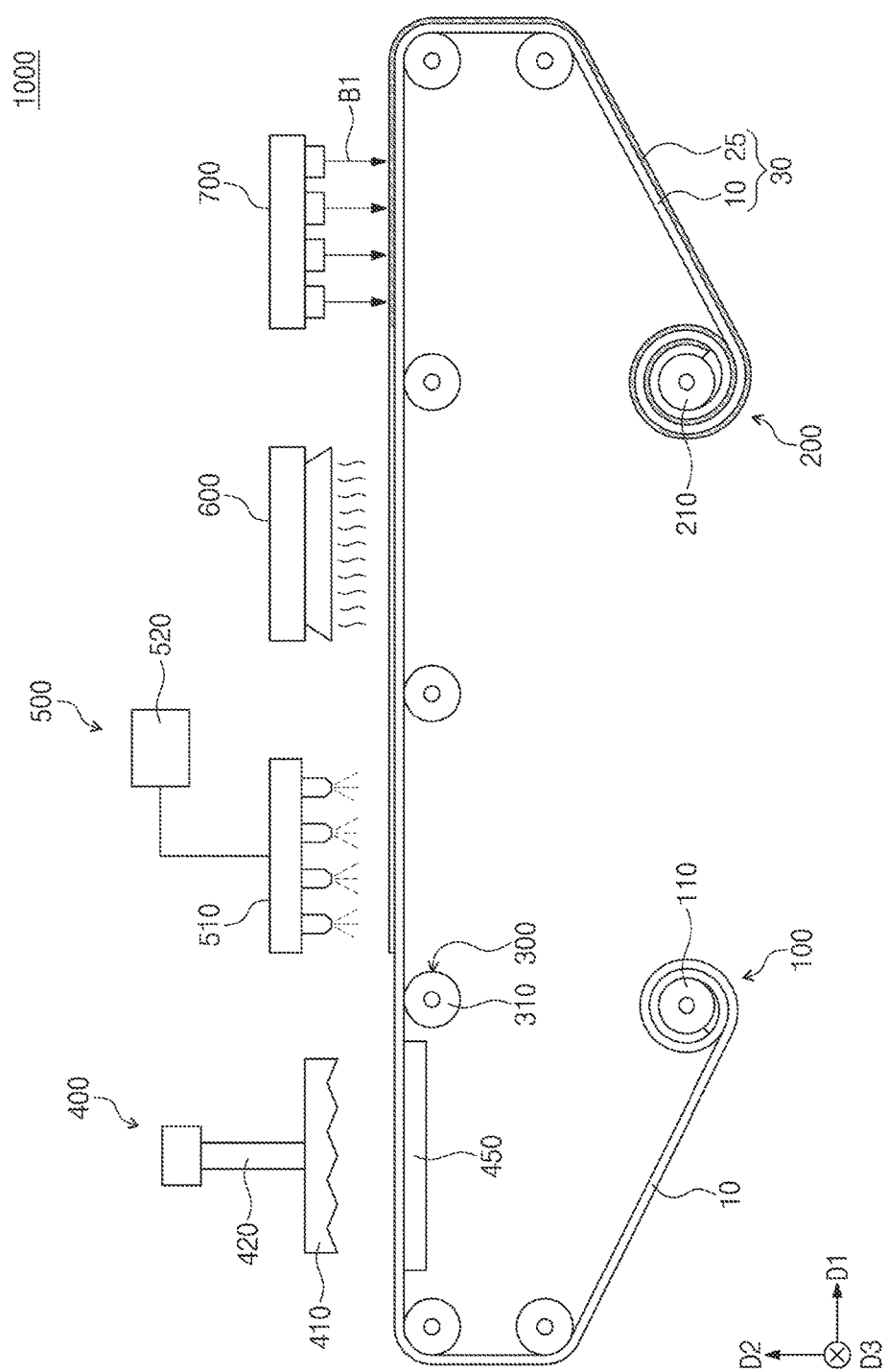
FIG. 1 is a schematic diagram illustrating an electrode-manufacturing apparatus according to example embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

The advantages and features of the present invention, and methods of achieving them will be apparent from the following exemplary embodiments that will be described below in detail with reference to the accompanying drawings showing the exemplary embodiments. It should be noted, however, that the present invention is not limited to the following exemplary embodiments, and may be implemented in various forms. Rather, the exemplary embodiments are provided only to disclose the present invention and let those skilled in the art fully know the scope of the present invention. The present invention is defined only by the scope of the claims and equivalents thereof. Like reference numerals refer to like elements throughout the specification.

Exemplary embodiments detailed in this description will be discussed with reference to sectional and/or plan views as idealized exemplary views of the present invention. In the drawings, thicknesses of layers and regions are exaggerated for effectively explaining the technical contents. Accordingly, regions exemplarily illustrated in the drawings are schematic in nature, and their shapes are intended to exemplarily disclose actual shapes of a region of a device and are not intended to limit the scope of the present invention. It will be understood that, although the terms "first", "second", "third", etc. may be used herein to describe various elements, these elements should not be limited by these terms. These terms are only used to distinguish one element from another element. The exemplary embodiments explained and illustrated herein include complementary embodiments thereof.

The terminology used herein is for the purpose of describing particular embodiments only and is not intended to limit the present invention. As used herein, the singular forms are intended to include the plural forms as well. It will be understood that the terms "comprises", and/or "comprising" specify the presence of stated elements, steps, operations, and/or devices, but do not preclude the presence or addition of one or more other elements, steps, operations, and/or devices.

Unless otherwise defined, all terms (including technical and scientific terms) used herein have the same meaning as commonly understood by one of ordinary skill in the art to which exemplary embodiments of the present invention belong. It will be further understood that terms, such as those defined in commonly-used dictionaries, are not interpreted in an idealized or overly formal sense unless expressly so defined herein.

It will be herein discussed about the present inventive concept and embodiments according to the present inventive concept with reference to drawings.

FIG. 1 is a schematic diagram illustrating an electrode-manufacturing apparatus according to example embodiments of the inventive concept.

Referring to FIG. 1, an electrode-manufacturing apparatus 1000 may be used to manufacture an electrode substrate of a capacitor. In some embodiments, the capacitor may be configured to store electric charges using movement of ions toward the interface between an electrode and an electrolyte or using a surface chemical reaction.

The apparatus 1000 may include a substrate supplying part 100, a substrate retrieving part 200, a transferring unit 300, a patterning unit 400, a coating unit 500, and a first light irradiation unit 700. The apparatus 1000 may further include a drying unit 600 for drying the electrode material.

The substrate supplying part 100 may include a supplying roller 110 and a motor (not shown) for rotating the supplying roller 110. The metal substrate 10 may be wound around the supplying roller 110. The supplying roller 110 may be provided to have a cylindrical shape extending in a third direction D3 perpendicular to the first direction D1. However, the inventive concept is not limited thereto.

The substrate retrieving part 200 may be configured to retrieve the electrode substrate 30 transferred by the transferring unit 300. The electrode substrate 30 may include the metal substrate 10 and an electrode layer 25. The substrate retrieving part 200 may include a retrieving roller 210 and a rotating motor (not shown) for rotating the retrieving roller 210. The retrieving roller 210 may be provided to have a cylindrical shape extending in the third direction D3. The apparatus 1000 may manufacture the electrode substrate 30 in a roll-to-roll manner.

The transferring unit 300 may be used to transfer the metal substrate 10, which is supplied from the substrate supplying part 100, in the first direction D1. According to some embodiments, the transferring unit 300 may include a plurality of transfer rollers 310 and a rotating motor (not shown), which is used to rotate the transfer rollers 310. Alternatively, in other embodiments, the supplying roller 110 and the retrieving roller 210 may be rotated to transfer the metal substrate 10 in the first direction D1. In this case, the transferring unit 300 may not include a rotating motor. The plurality of transfer rollers 310 may be disposed to be spaced apart from each other in the first direction D1. The transfer roller 310 may support a bottom surface of the metal substrate 10. The plurality of transfer rollers 310 may be provided to have an elongated cylindrical shape extending in the third direction D3.

The patterning unit 400 may be provided on a transfer path of the metal substrate 10. In some embodiments, the patterning unit 400 may be a press unit, which is configured to press the metal substrate 10 with a mold and thereby to perform a patterning process on the metal substrate 10. Hereinafter, the press unit and the patterning unit will be designated by the same reference numeral 400.

The press unit 400 may include a molding member 410, which is provided to be in contact with the metal substrate 10 and is used to pattern the metal substrate 10, and a mold driving member 420, which is used to transfer the molding member toward the metal substrate 10. The press unit 400 may include a supporting member 450, which is provided to face the molding member 410. The press unit 400 will be described in more detail below.

The electrode coating unit 500 may be disposed on the transfer path of the metal substrate 10. The electrode coating unit 500 may be spaced apart from the patterning unit 400 in the first direction D1. The electrode coating unit 500 may include a spray nozzle part 510 which is configured to spray an electrode material and an electrode material supplying part 520 which is configured to supply the electrode material to the spray nozzle part 510. In some embodiments, the electrode material may be in liquid state, but not limited thereto. The electrode material may contain graphene oxide GO. The spray nozzle part 510 may include a plurality of nozzles arranged along the first direction D1 and/or the third direction D3.

The drying unit 600 may be disposed on the transfer path of the metal substrate 10. The drying unit 600 may be spaced apart from the electrode coating unit 500 in the first direction D1. In some embodiments, the drying unit 600 may supply air toward the electrode material on the metal substrate 10. Therefore, the electrode material, which is in liquid state, may be dried. Alternatively, the drying unit 600 may heat the electrode material to evaporate water within the electrode material by blowing dry hot gas or irradiating infrared light.

The first light irradiation unit 700 may be disposed on the transfer path of the metal substrate 10. The first light irradiation unit 700 may be spaced apart from the drying unit 600 in the first direction D1. The first light irradiation unit 700 may include a xenon lamp. The first light irradiation unit 700 may be configured to irradiate light B1 toward the electrode material and to induce photoreduction of the electrode material. Here, the photoreduction means a process of removing some of oxygen-containing functional groups in the graphene oxide and thereby forming a reduced graphene oxide (rGO) with high electrical conductivity and an increased specific surface area.

Figure 2B:
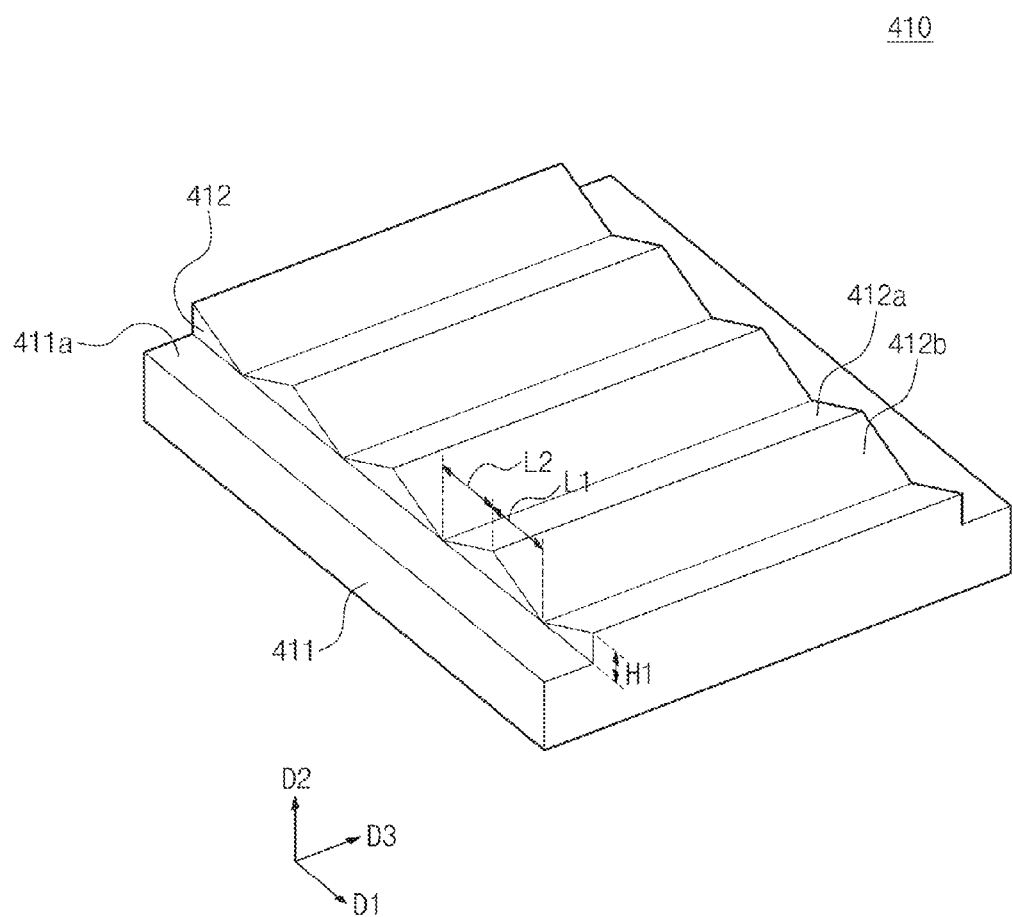
FIG. 2B is a perspective view illustrating a molding member shown in FIG. 2A.

FIG. 2A is a schematic diagram illustrating a press unit shown in FIG. 1. FIG. 2B is a perspective view illustrating a molding member shown in FIG. 2A.

Referring to FIGS. 1, 2A, and 2B, the press unit 400 may include the molding member 410, the mold driving member 420, and the supporting member 450, as described the above.

The molding member 410 may include a base plate 411 and patterned protrusions 412. The base plate 411 may have a first surface 411a and a second surface 411b opposite to each other. The first and second surfaces 411a and 411b may be a flat surface. The first surface 411a may face the supporting member 450. The base plate 411 may be provided in a rectangular shape, but the inventive concept is not limited thereto.

The patterned protrusions 412 may protrude from the first surface 411a of the base plate 411 toward the supporting member 450. Each of the patterned protrusions 412 may include a first mold inclined surface 412a, which is obliquely and upwardly extended from the first surface 411a, and a second mold inclined surface 412b, which is obliquely and downwardly extended from the first surface 411a. The first and second mold inclined surfaces 412a and 412b may be connected to each other. The first and second mold inclined surfaces 412a and 412b may extend in the third direction D3.

The first and second mold inclined surfaces 412a and 412b may be in contact with each other at a first position, which is spaced apart from the first surface 411a by a first height H1 in the second direction D2. The first surface 411a and the first mold inclined surface 412a may be in contact with each other at a second position, which is spaced apart from the first position by a first distance L1 in the first direction D1. The first surface 411a and the second mold inclined surface 412b may be in contact with each other at a third position, which is spaced apart from the first position by a second distance L2 in the first direction D1. The first distance L1 may be substantially the same as the second distance L2. Here, the height may be a distance in the second direction D2.

Each or at least one of the first and second mold inclined surfaces 412a and 412b may be a flat surface or a curved surface. In the case where the first and second mold inclined surfaces 412a and 412b are flat, each of the patterned protrusions 412 may be shaped like an isosceles triangle, when viewed in a vertical section taken in the second direction D2.

The mold driving member 420 may be connected with the second surface 411b of the base plate 411. The mold driving member 420 may be configured to allow the molding member 410 to move upward or downward in the second direction D2. The mold driving member 420 may be a hydraulic cylinder or a pneumatic cylinder, but not limited thereto.

The supporting member 450 may support the metal substrate 10, when the molding member 410 presses the metal substrate 10. The supporting member 450 may be positioned under the molding member 410. A surface of the supporting member 450 facing the molding member 410 may be flat.

Figure 3A:
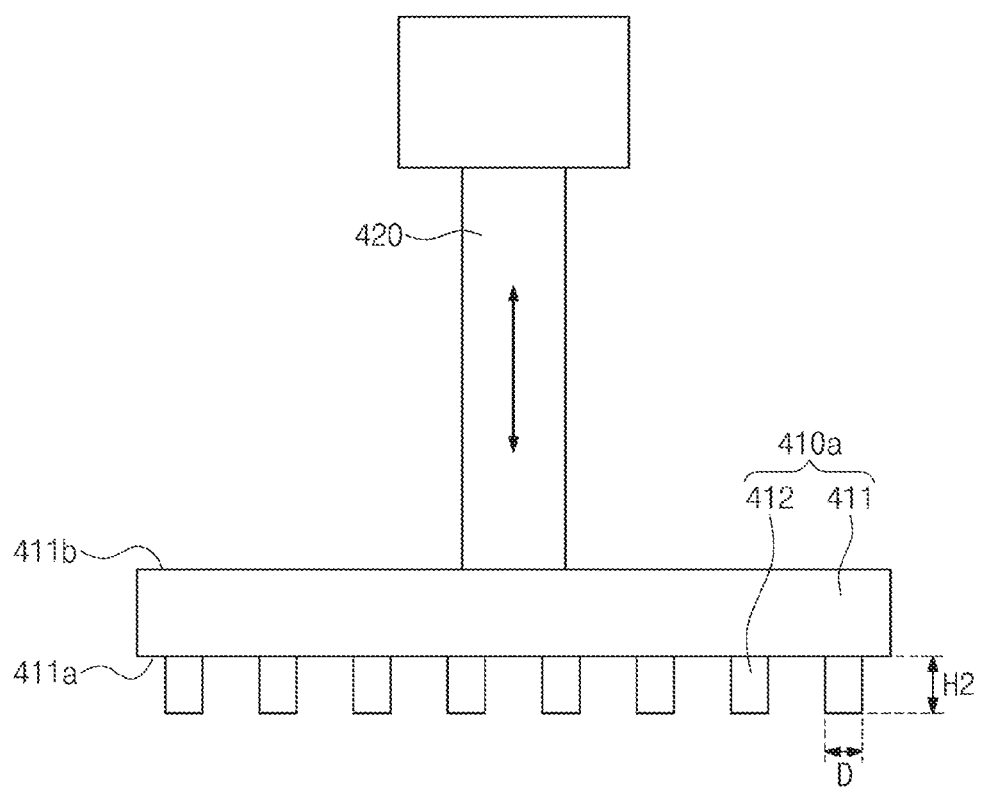
FIG. 3A is a schematic diagram illustrating a modified example of a press unit shown in FIG. 2A.
Figure 3B:
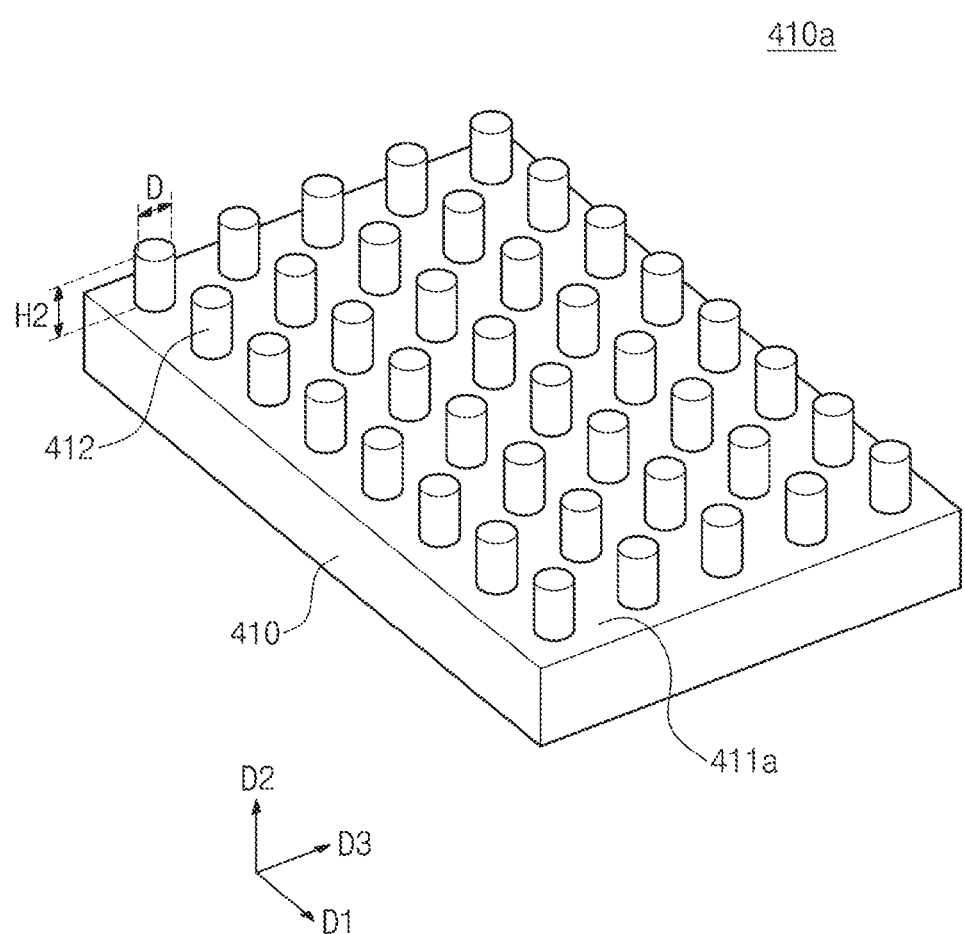
FIG. 3B is a perspective view illustrating a molding member shown in FIG. 3A.

FIG. 3A is a schematic diagram illustrating a modified example of a press unit shown in FIG. 2A. FIG. 3B is a perspective view illustrating a molding member shown in FIG. 3A. In the following description, an element described with reference to FIGS. 2A and 2B may be identified by a similar or identical reference number without repeating an overlapping description thereof, for the sake of brevity.

Referring to FIGS. 3A and 3B, a molding member 410a may include a base plate 411 and patterned protrusions 412. The patterned protrusions 412 may be shaped as a pillar. For example, the patterned protrusions 412 may have a cylindrical shape. The patted protrusions 412 may have a diameter D less than a height H2 of the patted protrusions 412. Here, the height H2 of the patted protrusions 412 may mean a length measured in the second direction D2.

The patterned protrusions 412 may be arranged in the first and third directions D1 and D2. The patterned protrusions 412 may be arranged in a matrix manner on the first surface 411a of the base plate 411.

FIG. 4 is a schematic view illustrating an electrode-manufacturing apparatus according to example embodiments of the inventive concept. In the following description, an element described with reference to FIG. 1 may be identified by a similar or identical reference number without repeating an overlapping description thereof, for the sake of brevity.

Referring to FIG. 4, an electrode-manufacturing apparatus 1001 may include a substrate supplying part (not shown), a substrate retrieving part (not shown), a transferring unit 300, a patterning unit 405, an electrode coating unit 500, a dry unit 600, and a first light irradiation unit 700. In addition, the apparatus 1001 may further include a second light irradiation unit 800.

The substrate supplying part (not shown) may supply a metal substrate 10, which is cut to have a predetermined length, to the transferring unit 300. The substrate retrieving part (not shown) may be configured to retrieve an electrode substrate 30 which has passed through the first light irradiation unit 700.

The transferring unit 300 may include a plurality of transfer rollers 310, a rotating motor (not shown), and a conveyor belt 320. The conveyor belt 320 may surround the plurality of transfer rollers 310. The rotation of the plurality of transfer rollers 310 may lead to a closed-loop motion of the conveyor belt 320. The metal substrate 10 may be placed on the conveyor belt 320 by the substrate supplying part (not shown).

The patterning unit 405 may be a printing unit, which is configured to spray metallic ink IK onto the metal substrate 10 and is used to pattern the metal substrate 10. For example, the printing unit 405 may be used to form a plurality of three-dimensional patterned protrusions, which are formed by spraying the metallic ink IK on the metal substrate 10. The printing unit 405 may include an ink spraying part 460 and an ink supplying part 470. The ink supplying part 470 may supply the metallic ink IK to the ink spraying part 460. The metallic ink IK may be formed of or include the same material as the metal substrate 10. The printing unit 405 will be described more detail below.

The second light irradiation unit 800 may be disposed on the transfer path of the metal substrate 10. The second light irradiation unit 800 may be spaced apart from the printing unit 405 in the first direction D1. The second light irradiation unit 800 may be disposed between the printing unit 405 and the electrode coating unit 500.

The second light irradiation unit 800 may include a lamp 810 which is configured to irradiate light B2 and a reflector 820 which is configured to reflect the incident light to the metal substrate 10. The lamp may include a halogen lamp or a xenon lamp, but not limited thereto. The metallic ink IK, which is provided on the plurality of patterned protrusions, may be photonically sintered by the light B2 irradiated from the second light irradiation unit 800 such that metallic ink patterns may have higher electrical conductivity.

Figure 5:
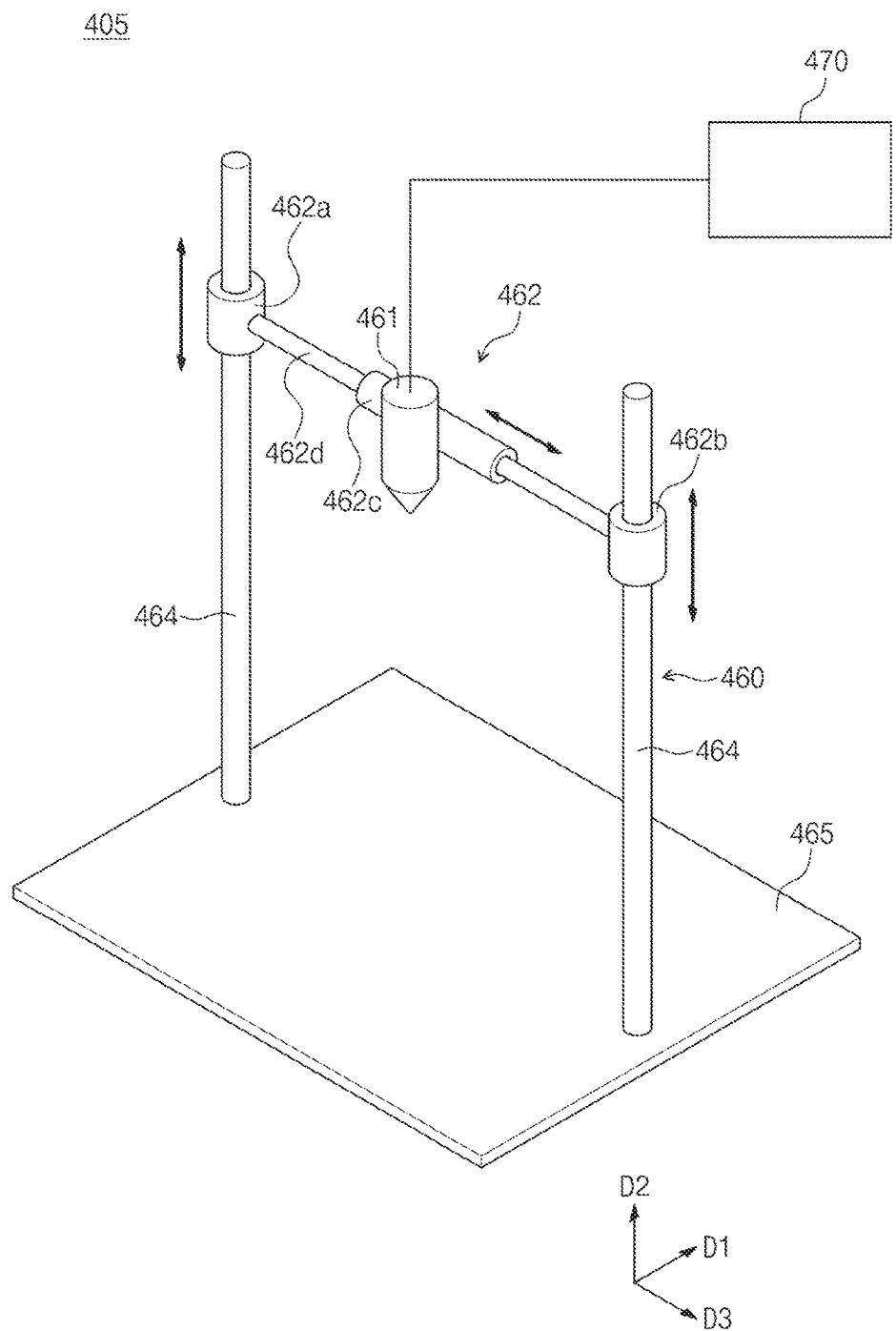
FIG. 5 is a schematic diagram illustrating a printing unit shown in FIG. 4.

FIG. 5 is a schematic diagram illustrating a printing unit shown in FIG. 4.

Referring to FIG. 5, the printing unit 405 may include an ink spraying part 460 and an ink supplying part 470. The ink spraying part 460 may include an ink spray nozzle 461, a nozzle driving member 462, a driving guide member 464, and a driving supporting member 465.

The driving supporting member 465 may support the ink spray nozzle 461 and the nozzle driving member 462. The driving supporting member 465 may be provided with a substantially rectangular shape.

The driving guide member 464 may guide movement of the nozzle driving member 462. For example, the driving guide member 464 may include a pair of supporters that are spaced apart from each other in the third direction D3. The supporters may have a cylindrical shape extending in the second direction D2.

The ink spray nozzle 461 may be spaced apart from the driving supporting member 465. The ink spray nozzle 461 may be disposed between the supporters. The ink spray nozzle 461 may spray the metallic ink on the metal substrate 10. The ink spray nozzle 461 may be configured to spray the metallic ink in an electrohydrodynamic manner. Accordingly, the ink spray nozzle 461 may be configured to spray nano-sized metallic ink droplets, and this may make it possible to form a plurality of fine patterned protrusions.

The ink spray nozzle 461 may be transferred by the nozzle driving member 462. For example, the ink spray nozzle 461 may be transferred in the second and third directions D2 and D3 by the nozzle driving member 462. The nozzle driving member 462 may include first and second transferring units 462a and 462b, which are configured to move along the driving guide member 464, a connecting member 462d, and a third transferring unit 462c, which is configured to move along the connecting member 462d.

The first and second transferring units 462a and 462b may be disposed on the supporters, respectively, and may be movable along the supporters or in the second direction D2. The first and second transferring units 462a and 462b may be spaced apart from each other in the third direction D3. The first and second transferring units 462a and 462b may be simultaneously moved in the same direction at the same time.

The connecting member 462d may connect the first and second transferring units 462a and 462b to each other. For example, the first and second transferring units 462a and 462b may be respectively connected to two opposite ends of the connecting member 462d. Accordingly, the first and second transferring units 462a and 462b may be used to move the connecting member 462d in the second direction D2. The connecting member 462d may have a bar shape extending in the third direction D3.

The third transferring unit 462c may be installed on the connecting member 462d to be movable. For example, the third transferring unit 462c may be configured to be movable in the third direction D3. Each of the first, second, and third transferring units 462a, 462b, and 462c may be a linear motor, but not limited thereto. The third transferring unit 462c may be combined with the ink spraying unit 461. Thus, the ink spraying unit 461 may move along the second direction D2 by the first and second transferring units 462a and 462b and along the third direction D3 by the third transferring unit 462c.

Figure 6A:
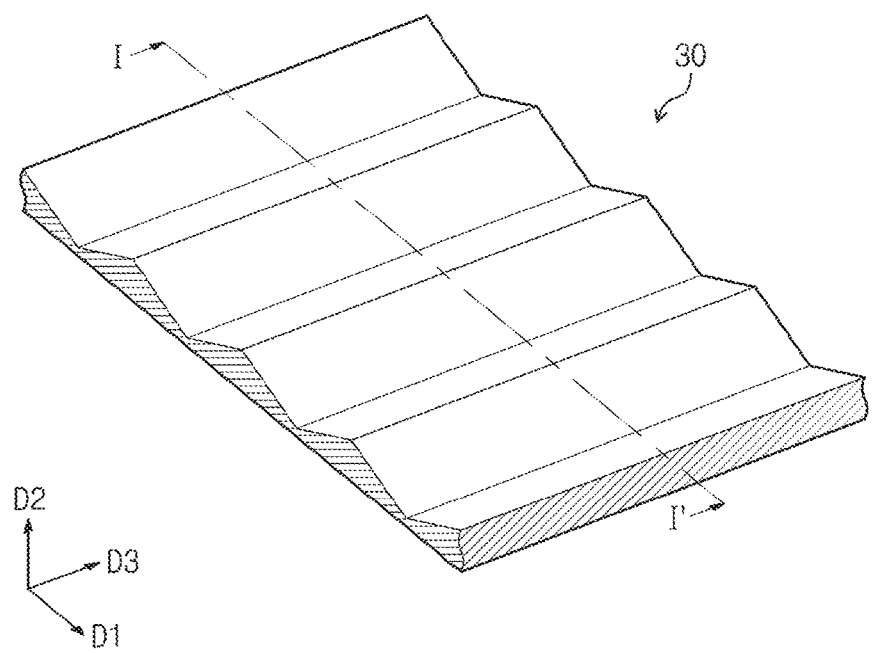
FIG. 6A is a perspective view illustrating an electrode substrate manufactured by the apparatus of FIG. 1.
Figure 6B:
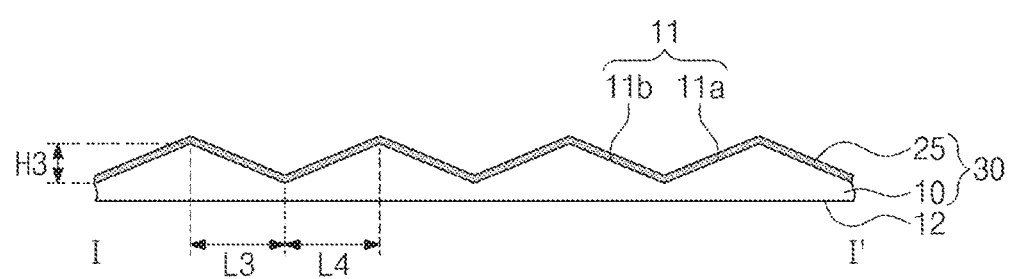
FIG. 6B is a cross-sectional view taken along a line I-I' shown in FIG. 6A.

FIG. 6A is a perspective view illustrating an electrode substrate manufactured by an electrode-manufacturing apparatus illustrated in FIG. 1. FIG. 6B is a cross-sectional view taken along a line I-I' shown in FIG. 6A. The electrode substrate 30 shown in FIGS. 6A and 6B may be manufactured by the apparatus 1000 including the press unit 400 shown in FIG. 2.

Referring to FIGS. 6A and 6B, an electrode substrate 30 may be an energy storing element, and the energy storing element may be a supercapacitor. The electrode substrate 30 may include a metal substrate 10 and an electrode layer 25.

The metal substrate 10 may have a first surface 11 and a second surface 12. The first and second surfaces 11 and 12 may be spaced apart from in the second direction D2. The electrode layer 25 may be disposed on the first surface 11. That is, the first surface 11 may be in contact with the electrode layer 25. The first surface 11 of the metal substrate 10 may be used as a current collector.

The first surface 11 may have a plurality of grooves 10c recessed toward the second surface 12. Therefore, a contact area between the metal substrate 10 and electrode layer 25 may be increased. The plurality of grooves 10c may be provided with a substantially V-shape, but not limited thereto. Each of the grooves 10c may include a first inclined surface 11a obliquely extending from the first surface 11 to the second surface 12 and a second inclined surface 11b obliquely extending from the first inclined surface 11a to the first surface 11. The first and second inclined surfaces 11a and 11b may be connected to each other. The first and second inclined surfaces 11a and 11b may extend in the third direction D3.

The first and second inclined surfaces 11a and 11b may be in contact with each other at a first position, which is spaced apart from the first surface 11 by a second height H3 in the second direction D2. The first surface 11 and the first inclined surface 11a may be in contact with each other at a second position, which is spaced apart from the first position by a third distance L3 in the first direction D1. The first surface 11 and the second inclined surface 11b may be in contact with each other at a third position, which is spaced apart from the first position by a forth distance L4 in the first direction D1. The third distance L3 may be substantially the same as the forth distance L4. The first and second inclined surfaces 11a and 11b may be a flat surface or a curved surface. The first and second inclined surfaces 11a and 11b may correspond to the first and second mold inclined surfaces 412a and 412b. For example, the first and second distances L1 and L2 may be substantially the same as the third and fourth distances L3 and L4. Sizes of the grooves 10c may be very small. For example, widths of the grooves 10c may range from several nanometers to several micrometers.

The metal substrate 10 may include a conductive material. For example, the metal substrate 10 may include at least one of aluminum (Al) or copper (Cu). The metal substrate 10 may be provided to have a thin thickness. For example, a height between the first and second surfaces 11 and 12 may be about 1 mm, but not limited thereto.

The electrode layer 25 may be disposed on the first surface 11 of the metal substrate 10. For example, the electrode layer 25 may cover the first surface 11 of the metal substrate 10. In some embodiments, the electrode layer 25 may include reduced graphene oxide. For example, the reduced graphene oxide may have a low energy density (e.g., lower than 20 J/cm$^2$) and high electrical conductivity (e.g., resistivity lower than about 0.01 Ωcm).

Figure 7A:
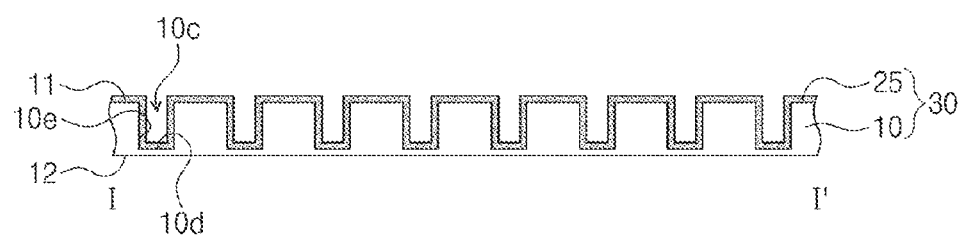
FIGS. 7A and 7B are cross-sectional views illustrating modified examples of electrode substrates manufactured by the apparatus of FIG. 1.
Figure 7B:
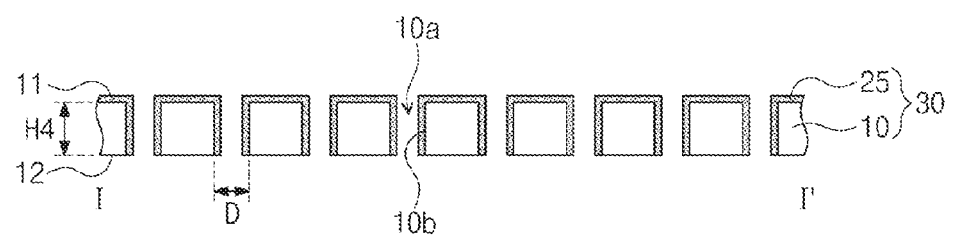

FIGS. 7A and 7B are cross-sectional views illustrating modified examples of electrode substrates manufactured by an electrode-manufacturing apparatus illustrated in FIG. 1. FIGS. 7A and 7B illustrate cross sections taken along the same direction with FIG. 6B. The electrode substrate shown in FIGS. 7A and 7B may be manufactured by the apparatus 1000 including the press unit 400 shown in FIG. 3A. In the following description, an element described with reference to FIG. 6B may be identified by a similar or identical reference number without repeating an overlapping description thereof, for the sake of brevity.

Referring to FIG. 7A, the electrode substrate 30 may include a metal substrate 10 and an electrode layer 25. The first surface 11 of the metal substrate 10 may have a plurality of grooves 10c recessed toward the second surface 12. The plurality of grooves 10c may be provided with a substantially U-shape, but not limited thereto.

Each of the grooves 10c may include a bottom surface dispose between the first and second surfaces 11 and 12 and a side surface 10e connecting the bottom surface 10d and the first surface 11. The bottom surface 10d may not be vertically overlapped with the first surface 11. In some embodiments, the side surface 10e may vertically extend from the bottom surface 10d to the first surface 11. Alternatively, in other embodiments, the side surface 10e may obliquely extend from the bottom surface 10d to the first surface 11.

Referring to FIG. 7B, an electrode substrate 30 may include a metal substrate 10 and an electrode layer 25. The metal substrate 10 may include a plurality of holes 10a penetrating the first and second surfaces 11 and 12. The plurality of holes 10a may have a cylindrical shape. When the holes 10a are formed on the metal substrate 10, a portion of the first surface and a portion of the second surface 12 may be removed. Areas of the portions of the first and second surfaces 11 and 12 removed by forming the holes 10a may be named as a removed area. Also, when the holes 10a are formed, an inner surface 10b of the metal substrate 10 may be exposed to outside. The inner surface 10b exposed by the holes 10a may be named as a side surface of the hole.

Diameters D of the holes may be less than a thickness H4 of the metal substrate 10. In other words, diameters D of the holes may be less than a height between the first and second surfaces 11 and 12. Here, the side surface 10b of hole may have an area greater than the removed area. Accordingly, the surface area of the metal substrate 10 exposed to outside may be increased. For example, diameters D of holes 10a may be 0.5 times the height H4 between the first and second surfaces 11 and 12. Here, the surface area of the metal substrate 10 may be increased up to the maximum.

Figure 8A:
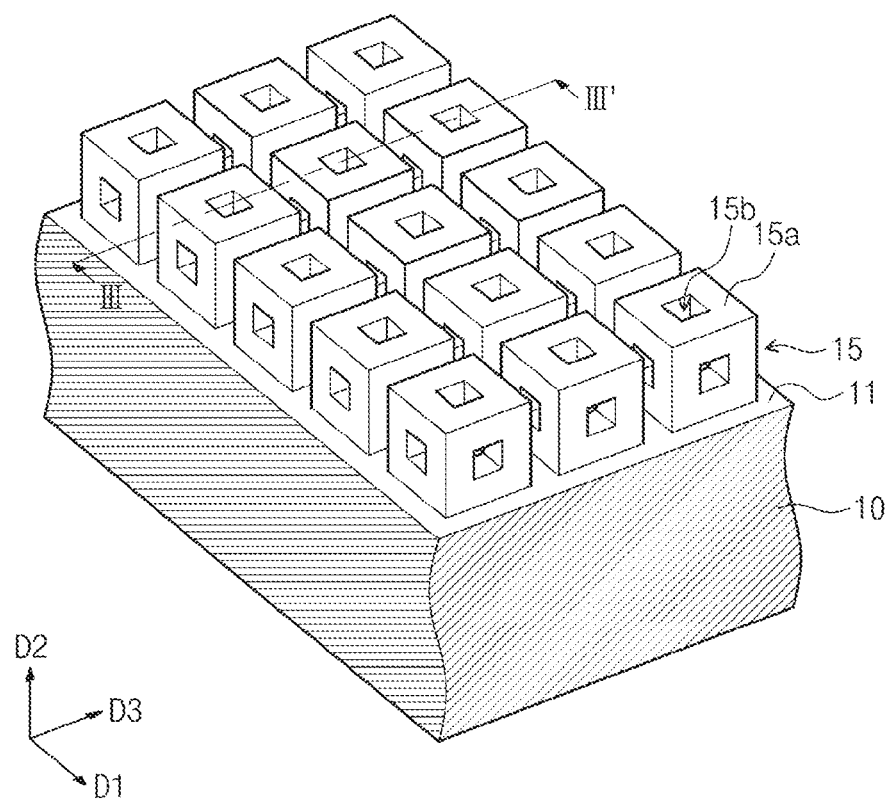
FIG. 8A is a perspective view illustrating an electrode substrate manufactured by an electrode-manufacturing apparatus illustrated in FIG. 4.
Figure 8B:
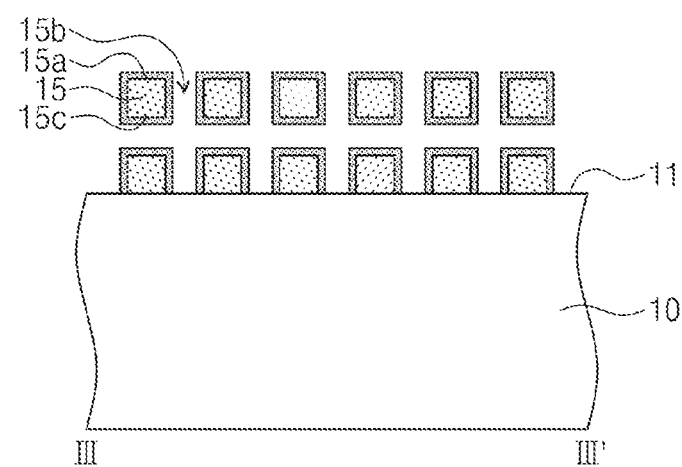
FIG. 8B is a cross-sectional view taken along a line shown in FIG. 8A.

FIG. 8A is a perspective view illustrating an electrode substrate manufactured by an electrode-manufacturing apparatus illustrated in FIG. 4. FIG. 8B is a cross-sectional view taken along a line shown in FIG. 8A. In the following description, an element described with reference to FIG. 6B may be identified by a similar or identical reference number without repeating an overlapping description thereof, for the sake of brevity.

Referring to FIGS. 8A and 8B, an electrode substrate 30 may include a metal substrate 10 and an electrode layer 25. First and second surfaces 11 and 12 of the metal substrate 10 may be flat, but not limited thereto.

Metal protrusions 15 may be disposed on the first surface 11 of the metal substrate 10. The metal protrusions 15 may be arranged along the first and third directions D1 and D3 on the metal substrate 10. Each of the metal protrusions 15 may have a substantially regular hexahedron shape. Each of the metal protrusions 15 may have a plurality of through-holes penetrating outer side surfaces opposite to each other. In other words, each of the metal protrusions 15 may be provided with Menger sponge structure. Accordingly, surface areas of the metal protrusions 15 may be increased to increase an area contacting the electrode layer 25. In other words, the metal protrusions 15 may form a Menger sponge type fractal structure to make increase surface area of the metal substrate. In other words, as the metal protrusions 15 form three-dimensional fractal structure, surface area of the metal substrate 10 may be increased. Here, the surface area of the metal substrate 10 may be function as a current collector.

A method for manufacturing electrodes by using the electrode-manufacturing apparatus according to the inventive concepts will be described below.

FIGS. 9A to 9D are cross-sectional views illustrating a method for manufacturing an electrode substrate of FIG. 6B by using an electrode-manufacturing apparatus illustrated in FIG. 1. In the following description, an element described with reference to FIGS. 6A and 6B may be identified by a similar or identical reference number without repeating an overlapping description thereof, for the sake of brevity.

Figure 9A:
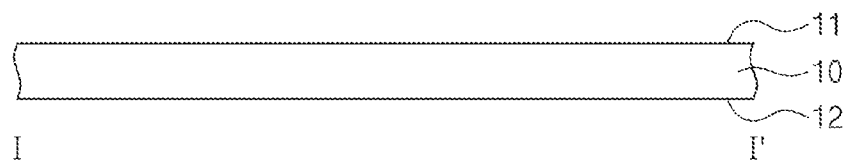
FIGS. 9A to 9D are cross-sectional views illustrating a method for manufacturing an electrode substrate of FIG. 6B by using the apparatus of FIG. 1.

Referring to FIGS. 1, 6B, and 9A, the substrate supplying part 100 may be configured to supply the metal substrate 10, which will be used to form the electrode substrate 30. The metal substrate 10 may have first and second surface 11 and 12. The first surface 11 and/or the second surface 12 may be a flat surface. The metal substrate 10 may be transferred to the press unit 400 by the transferring unit 300.

Figure 9B:
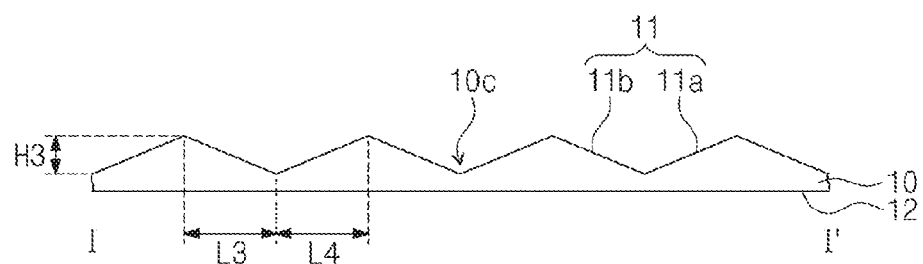

Referring to FIGS. 1, 6B, and 9B, the press unit 400 may press the first surface of the metal substrate 10. Therefore, the metal substrate 10 may be patterned. In some embodiments, the metal substrate 10 may be patterned to have a plurality of grooves 10c, each of which is recessed from the first surface 11 toward the second surface 12. Alternatively, in other embodiments, the metal substrate 10 may be patterned to have a plurality of holes extending from the first surface 11 to the second surface 12. As shown FIG. 9B, the plurality of grooves 10c may be provided to have a substantially V-shaped structure. Each of the grooves 10c may include a first inclined surface 11a obliquely extending from the first surface 11 to the second surface 12 and a second inclined surface 11b obliquely extending from the first inclined surface 11a to the first surface 11.

Figure 9C:
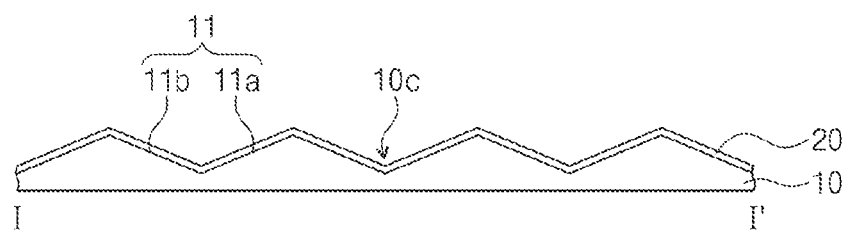

Referring to FIGS. 1, 6B, and 9C, the transferring unit 300 may transfer the pattered metal substrate 10 to the electrode coating unit 500. The electrode coating unit 500 may spray an electrode material in liquid state toward the patterned metal substrate 10. The patterned metal substrate 10 may be coated with the electrode material. That is, an electrode material coating layer 20 may be provided on the first surface 11 of the metal substrate 10. A contact area between the electrode material coating layer 20 and the patterned metal substrate 10 may be greater than a surface area of an un-patterned metal substrate 10.

The transferring unit 300 may transfer the coated metal substrate 10 to the drying unit 600. The electrode material coated on the metal substrate 10 may be dried by the drying unit 600.

Figure 9D:
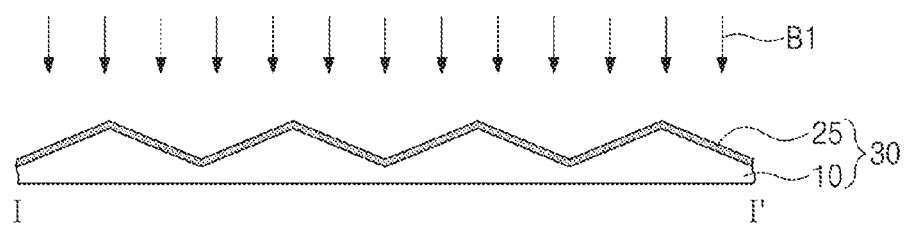

Referring to FIGS. 1, 6B, and 9D, the electrode material coated on the metal substrate 10 may be photonically sintered by the light B1 irradiated from the first light irradiation unit 700. For example, the graphene oxide may have a low energy density (e.g., lower than 20 J/cm$^2$) and high electrical conductivity (e.g., resistivity lower than about 0.01 Ωcm). That is, the electrode material coating layer 20 may be changed to an electrode layer 25 with a high electrical conductivity.

FIGS. 10A to 10D are cross-sectional views illustrating a manufacturing process of an electrode substrate of FIG. 8B by using an electrode-manufacturing apparatus illustrated in FIG. 4. In the following description, an element described with reference to FIGS. 8A and 8B may be identified by a similar or identical reference number without repeating an overlapping description thereof, for the sake of brevity.

Referring to FIGS. 4, 8B, and 9A, the substrate supplying part (not shown) may provide a metal substrate 10, which will be used to form an electrode substrate. The metal substrate 10 may have first and second surfaces 11 and 12 that are opposite to each other. The first surface 11 and/or the second surface 12 may be flat. The metal substrate 10 may be transferred to the printing unit 405 by the transferring unit 300.

Figure 10A:
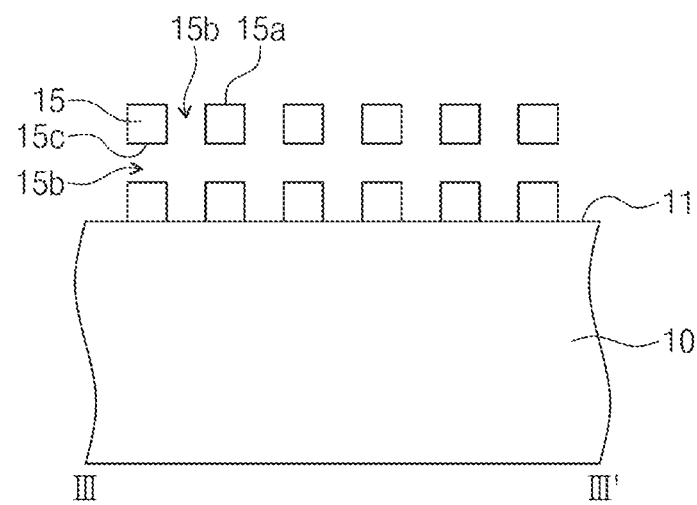
FIGS. 10A to 10D are cross-sectional views illustrating a manufacturing process of an electrode substrate of FIG. 8B by using an electrode-manufacturing apparatus illustrated in FIG. 4.
Figure 10B:
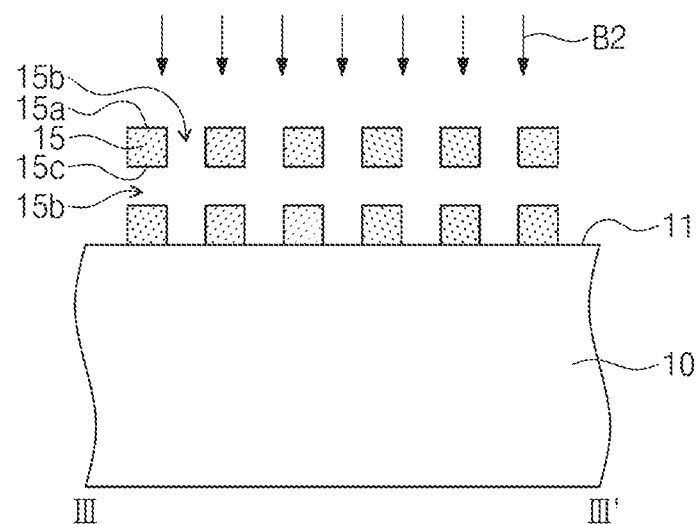

Referring to FIGS. 4, 8B, and 10A, the printing unit 405 may spray metallic ink IK of FIG. 4 onto the first surface 11 of the metal substrate 10, and thus, the metal substrate 10 may be patterned. In some embodiments, the metal substrate 10 may be patterned to have a plurality of three-dimensional patterned protrusions. Each of the metal protrusions 15 may be provided in the form of a Menger sponge, as described above. Thus, surface areas of the metal protrusions 15 may be increased.

Referring to FIGS. 4, 8B, and 10A, the transferring unit 300 may transfer the patterned metal substrate 10 to the second light irradiation unit 800. The second light irradiation unit 800 may irradiate light B2 toward the metal protrusions 15. Thus, the metal protrusions 15 may be photonically sintered by the light B2.

Figure 10C:
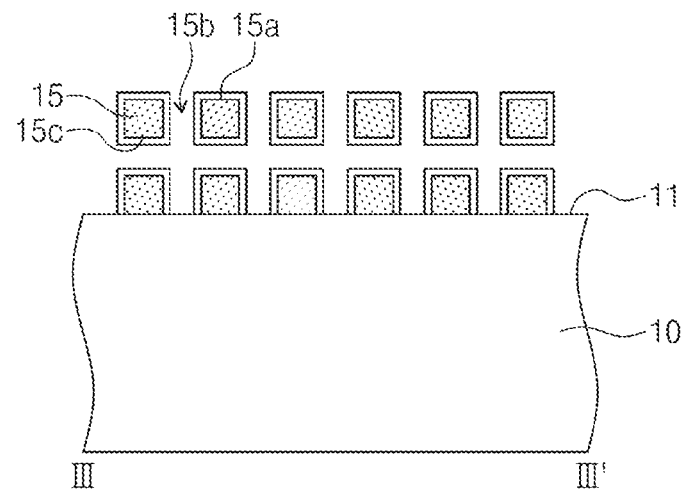

Referring to FIGS. 4, 8B, and 10C, the transferring unit 300 may transfer the patterned metal substrate 10 to the coating unit 500. The coating unit 500 may spray an electrode material, which is in liquid state, to the patterned metal substrate 10. The patterned metal substrate 10 may be coated with the electrode material. For example, the first surface 11 of the metal substrate 10, outer surfaces 15a of the metal protrusions 15, and inner surfaces 15c of the metal protrusions 15 exposed by the through holes 15a may be coated with the electrode material.

The transferring unit 300 may transfer the metal substrate 10 coated with the electrode material to the drying unit 600. The electrode material coated on the metal substrate 10 may be dried by the drying unit 600.

Figure 10D:
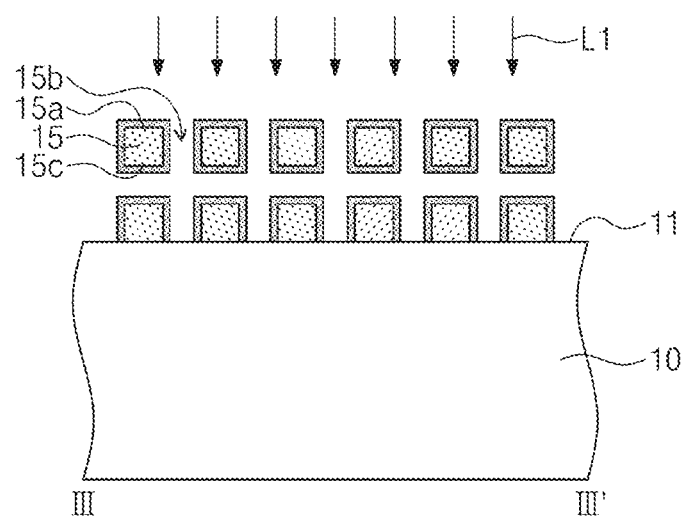

Referring to FIGS. 4, 8B, and 10D, the electrode material coated on the metal substrate 10 may be photonically sintered by the light.

According to exemplary embodiments of the inventive concept, a contact area between the metal substrate (e.g., a current collector) and the metal layer may be increased. In addition, it is possible to easily and rapidly manufacture the electrode substrate.

Effects of the present inventive concept is not limited to the above-mentioned one, other effects which have not been mentioned above will be clearly understood to those skilled in the art from the following description.

Although the present inventive concept has been described in connection with the embodiments of the present inventive concept illustrated in the accompanying drawings, it will be understood by one of ordinary skill in the art that variations in form and detail may be made therein without departing from the spirit and essential features of the inventive concept. The above disclosed embodiments should thus be considered illustrative and not restrictive.

What is claimed is:

1. An apparatus for manufacturing electrodes comprising:
a transferring unit configured to transfer a metal substrate in a first direction;
a patterning unit configured to pattern the metal substrate, the patterning unit provided on a path on which the metal substrate is transferred;
an electrode coating unit configured to coat an electrode material on the metal substrate, the electrode coating unit spaced apart from the patterning unit in the first direction; and
a first light irradiation unit configured to irradiate light, the first light irradiation unit spaced apart from the electrode coating unit in the first direction,
wherein:
the patterning unit is a press unit which includes a supporting member, a base plate, and a plurality of patterned protrusions protruded from a first surface of the base plate;
the patterned protrusions and the supporting member are disposed such that the metal substrate is interposed between the patterned protrusions and the supporting member;
the patterned protrusions of the press unit contacts and presses the metal substrate on the supporting member such that an upper surface of the metal substrate is pressed and patterned.

2. The apparatus of claim 1, wherein the patterning unit further comprises:
a mold driving member configured to transfer a molding member to the metal substrate.

3. The apparatus of claim 2, wherein each of the plurality of patterned protrusions of the press unit comprises:
a first mold surface obliquely extending from the first surface; and
a second mold surface obliquely extending from the first surface toward the first mold surface.

4. The apparatus of claim 2, wherein each of the plurality of patterned protrusions of the press unit has a cylindrical shape.

5. The apparatus of claim 1, further comprising a drying unit configured to spray air toward the metal substrate, wherein the drying unit is disposed between the first light irradiation unit and the electrode coating unit.

6. The apparatus of claim 1, wherein the electrode material includes graphene oxide.

7. The apparatus of claim 1, wherein each of the plurality of patterned protrusions of the press unit comprises:
a first mold surface obliquely extending from the first surface; and
a second mold surface obliquely extending from the first surface toward the first mold surface,
wherein the first mold surface and the second mold surface collectively form a V-shape, with an edge of the V-shape being a lowermost part of each of the patterned protrusions, and
wherein patterned protrusions press the upper surface of the metal substrate to have a plurality of V-shaped grooves.

8. An apparatus for manufacturing electrodes comprising:
a transferring unit configured to transfer a metal substrate in a first direction;
a patterning unit configured to pattern the metal substrate, the patterning unit provided on a path on which the metal substrate is transferred;
an electrode coating unit configured to coat an electrode material on the metal substrate, the electrode coating unit spaced apart from the patterning unit in the first direction; and
a first light irradiation unit configured to irradiate light, the first light irradiation unit spaced apart from the electrode coating unit in the first direction,
wherein the patterning unit comprises:
an ink spray nozzle configured to spray a metallic ink toward the metal substrate; and
a nozzle driving member configured to transfer the ink spray nozzle,
wherein the apparatus further comprises a second light irradiation unit configured to irradiate light toward the metallic ink, wherein the second light irradiation unit is disposed between the patterning unit and the electrode coating unit.

* * * * *